(12) United States Patent
Menheere

(10) Patent No.: US 11,542,836 B2
(45) Date of Patent: Jan. 3, 2023

(54) BI-MATERIAL JOINT FOR ENGINE

(71) Applicant: PRATT & WHITNEY CANADA CORP., Longueuil (CA)

(72) Inventor: David Menheere, Norval (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 17/337,621

(22) Filed: Jun. 3, 2021

(65) Prior Publication Data

US 2022/0389837 A1 Dec. 8, 2022

(51) Int. Cl.
*F01D 25/28* (2006.01)
*F01D 25/24* (2006.01)
*F01D 25/00* (2006.01)

(52) U.S. Cl.
CPC ......... *F01D 25/243* (2013.01); *F01D 25/005* (2013.01); *F01D 25/28* (2013.01); *F05D 2220/323* (2013.01); *F05D 2240/14* (2013.01); *F05D 2260/31* (2013.01); *F05D 2260/37* (2013.01); *F05D 2300/133* (2013.01); *F05D 2300/175* (2013.01)

(58) Field of Classification Search
CPC ........ F01D 25/243; F01D 25/28; F01D 25/30; F01D 25/246; F01D 25/005; F01D 15/10; F02C 7/32; F05D 2260/31; F05D 2260/36; F05D 2230/642; F05D 2240/14; F05D 2260/37; F05D 2300/50211; F05D 2300/50212; F05D 2300/502; F05D 2300/5021; F02K 1/80; Y10T 403/64; Y10T 403/642; Y10T 403/645; Y10T 403/21; Y10T 403/213; Y10T 403/217
See application file for complete search history.

(56) References Cited

U.S. PATENT DOCUMENTS

| | | | |
|---|---|---|---|
| 3,394,919 A | 7/1968 | Catterfeld | |
| 4,991,991 A * | 2/1991 | Ito | C04B 37/005 403/30 |
| 5,503,490 A * | 4/1996 | Melton | F01D 25/243 415/214.1 |
| 10,018,205 B2 * | 7/2018 | Pinkney | F01D 5/025 |
| 10,718,450 B2 | 7/2020 | Tyburcy et al. | |
| 2016/0130958 A1 * | 5/2016 | Ganoe | F01D 25/005 415/200 |

* cited by examiner

*Primary Examiner* — Christopher Verdier
*Assistant Examiner* — Maxime M Adjagbe
(74) *Attorney, Agent, or Firm* — Norton Rose Fulbright Canada LLP

(57) ABSTRACT

An engine bi-material joint includes a first flange composed of a first material and defining a first coefficient of thermal expansion, and a second flange composed of a second material and defining a second coefficient of thermal expansion. The second flange is different from the first material. An interface flange is engaged with the first flange and with the second flange. The interface flange defines a third coefficient of thermal expansion being equal to or less than the first coefficient of thermal expansion of the first flange. The third coefficient of thermal expansion is less than the second coefficient of thermal expansion of the second flange. The first coefficient of thermal expansion of the first flange is less than the second coefficient of thermal expansion of the second flange.

20 Claims, 2 Drawing Sheets

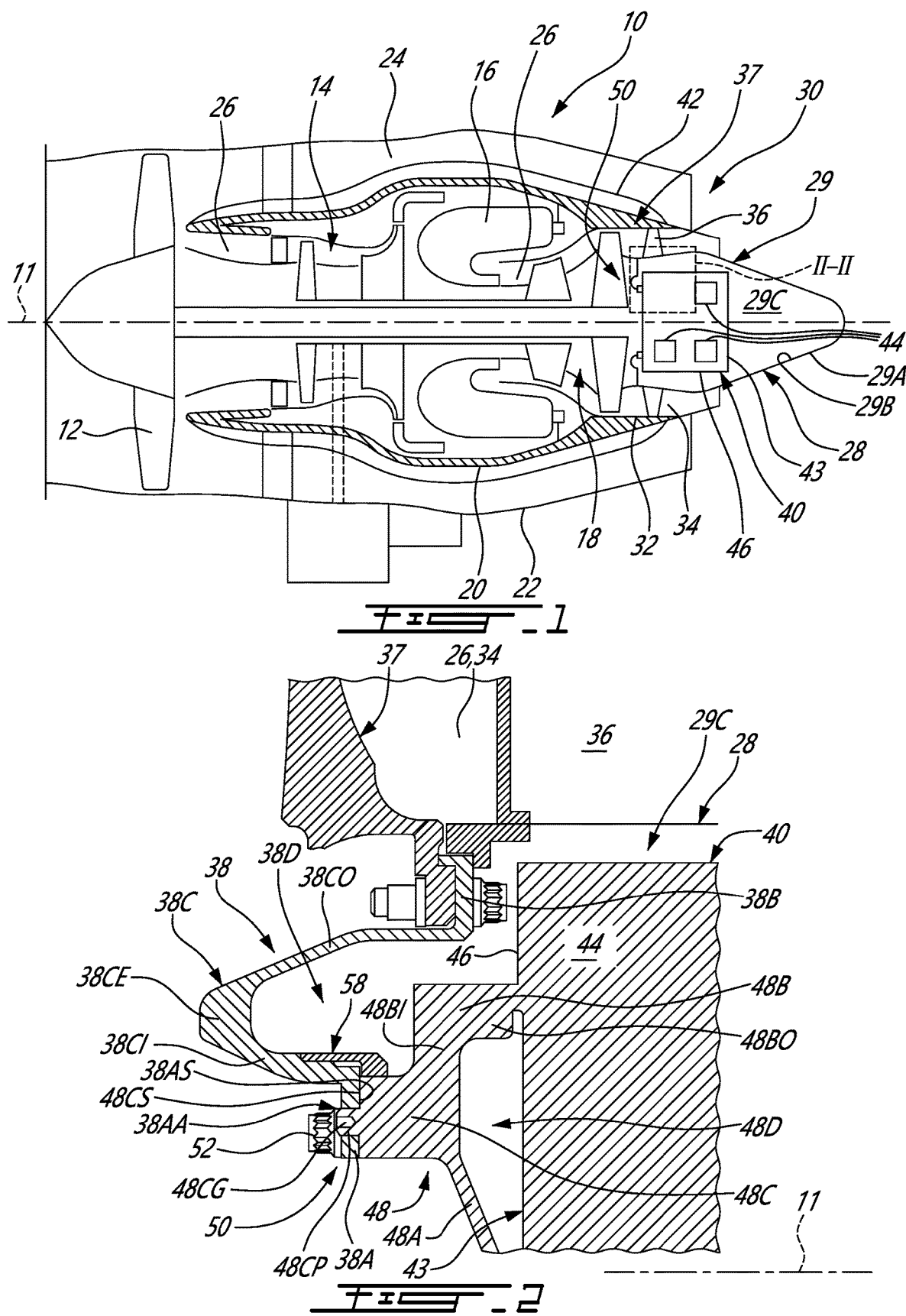

BI-MATERIAL JOINT FOR ENGINE

TECHNICAL FIELD

The application relates generally to engines, and more particularly, to joints in an engine.

BACKGROUND

Exhaust ducts of engines are subject to thermal stresses. In some applications, thermal gradients between engine casing components, particularly at the joints of casing components, can create areas of high stress at the joints. High stresses are known to reduce the fit at the joints which can cause a loosening of the joints.

SUMMARY

There is disclosed a method of assembling a bi-material joint. The method comprises assembling a first flange composed of a first material and having a first coefficient of thermal expansion to a second flange composed of a second material and having a second coefficient of thermal expansion. The method comprises engaging an interface flange to both of the first and second flanges and interference fitting the interface flange to at least the first flange. The interface flange has a third coefficient of thermal expansion that is less than or equal to the first coefficient of thermal expansion, and less than the second coefficient of thermal expansion. The method comprises securing the first flange to the second flange to form the bi-material joint.

There is disclosed an aircraft engine, comprising: an exhaust cone defining a center axis and an internal cavity; a generator case within the internal cavity of the exhaust cone, the generator case having a generator case flange composed of a first material and defining a first coefficient of thermal expansion; and a turbine support case (TSC) having a TSC flange composed of a second material and defining a second coefficient of thermal expansion, the second material being different from the first material; and a joint between the TSC and the generator case, the generator case flange secured to the TSC flange at the joint, the joint comprising an interface flange engaged with the generator case flange and with the TSC flange, the interface flange defining a third coefficient of thermal expansion being equal to or less than the first coefficient of thermal expansion of the generator case flange, the third coefficient of thermal expansion being less than the second coefficient of thermal expansion of the TSC flange.

There is disclosed an engine bi-material joint, comprising: a first flange composed of a first material and defining a first coefficient of thermal expansion; a second flange composed of a second material and defining a second coefficient of thermal expansion, the second flange being different from the first material; and an interface flange engaged with the first flange and with the second flange, the interface flange defining a third coefficient of thermal expansion being equal to or less than the first coefficient of thermal expansion of the first flange, the third coefficient of thermal expansion being less than the second coefficient of thermal expansion of the second flange, and the first coefficient of thermal expansion of the first flange being less than the second coefficient of thermal expansion of the second flange.

DESCRIPTION OF THE DRAWINGS

Reference is now made to the accompanying figures in which:

FIG. 1 is a schematic cross-sectional view of a gas turbine engine;

FIG. 2 is an enlarged cross-sectional view of section II-II of FIG. 1 showing a bi-material joint;

DETAILED DESCRIPTION

Figure 3:
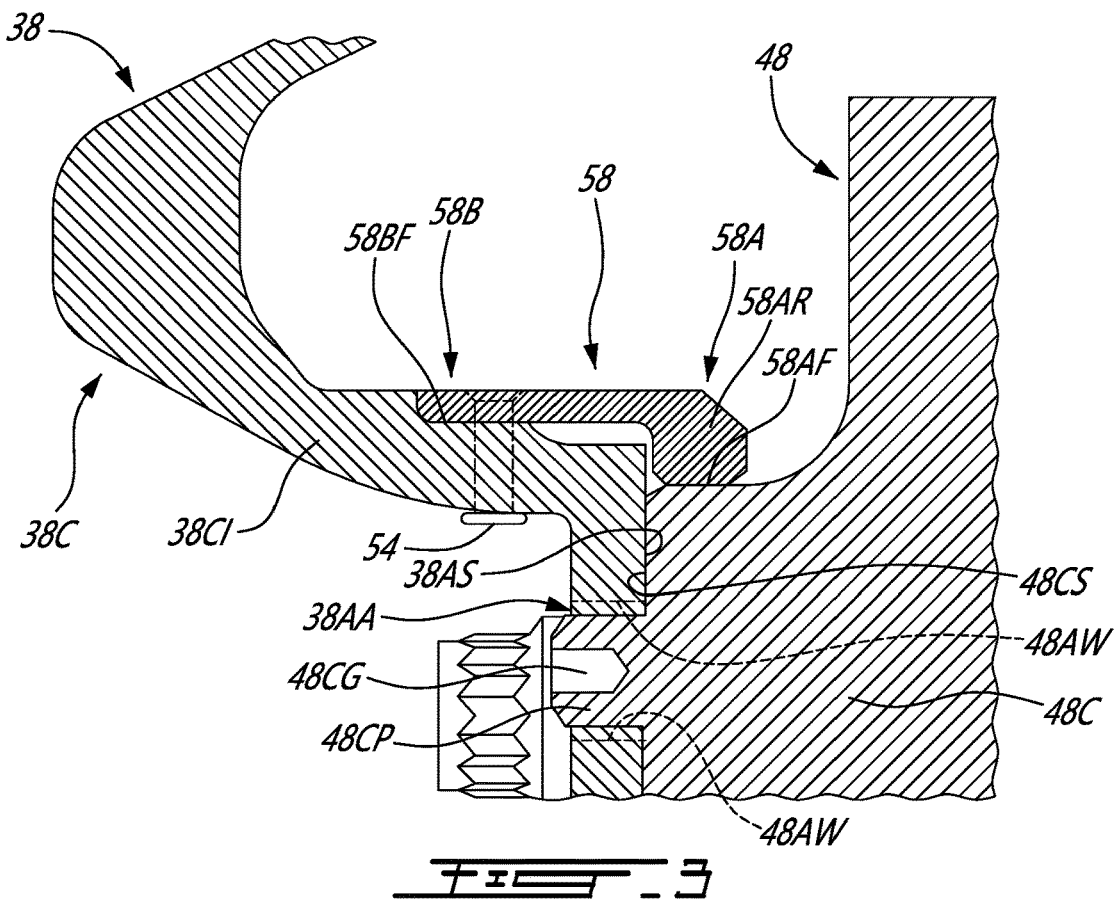
FIG. 3 is another view of what is shown in FIG. 2.

FIG. 1 illustrates a gas turbine engine 10 of a type preferably provided for use in subsonic flight, generally comprising in serial flow communication along a longitudinal axis 11 a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases.

The gas turbine engine 10 includes a core engine casing 20 which encloses the turbo machinery of the engine, and an outer casing 22 disposed radially outwardly of the core engine casing 20 such as to define an annular bypass passage 24 therebetween. The air propelled by the fan 12 is split into a first portion which flows around the core engine casing 20 within the bypass passage 24, and a second portion which flows through the core of the engine 10 via a main gas path 26, which is circumscribed by the core engine casing 20 and allows the flow to circulate through the compressor section 14, the combustor 16 and the turbine section 18 as described above.

At an aft end of the engine 10, an exhaust cone 28 is centered about, and axially extends along, the longitudinal axis 11 of the engine 10. The exhaust cone 28 is connected to an aft end of the turbine section 18, and may sometimes be referred to as a "tail cone". The exhaust cone 28 has an outer surface 29A which defines an inner wall of the main gas path 26 so that the combustion gases flow therearound. The exhaust cone 28 has an inner surface 29B which is spaced radially inwardly of the outer surface 29A. The inner surface 29B defines or delimits an internal cavity 29C of the exhaust cone 28. The internal cavity 29C is a void or hollow within the exhaust cone 28 which occupies some or all of the internal volume of the exhaust cone 28. As will be described in greater detail below, components of the engine 10 may be positioned in the internal cavity 29C.

The gas turbine engine 10 includes an exhaust section 30 for channeling the combustion gases to an exhaust outlet. The exhaust section 30 includes an outer shroud 32 surrounding an inner shroud (e.g. the exhaust cone 28). The shroud 32 may be referred to as an "exhaust outer shroud". In some embodiments, the shroud 32 may form a continuation of the core engine casing 20. A core duct 34 is defined radially relative to the longitudinal axis 11 between the exhaust cone 28 and the shroud 32 to provide the main gas path 26.

Referring to FIG. 1, a turbine support case (TSC) 37 may define part of the outer shroud 32. The TSC 37, sometimes referred to as a turbine exhaust case, is a portion of the core engine casing 20 that supports components of the turbine section 18. The TSC 37 is an annular body defined about the longitudinal axis 11. The TSC 37 is disposed radially outwardly of the exhaust cone 28 and may surround some or all of the exhaust cone 28 to further define the core duct 34.

The exhaust section 30 includes one or more struts 36 extending radially in the core duct 34. In the embodiment shown in FIG. 1, the struts 36 abut and extend between the exhaust cone 28 and the shroud 32 to interconnect the exhaust cone 28 and the shroud 32 and/or the TSC 37 together. For example, the exhaust section 30 may include a series of circumferentially spaced apart struts 36 interconnecting the exhaust cone 28 and the shroud 32. The struts 36 may be disposed circumferentially equidistant from each other about the longitudinal axis 11.

Referring to FIG. 1, a generator 40 is disposed in the internal cavity 29C of the exhaust cone 28. The generator 40 includes a generator case 43 that houses electric and/or mechanical components 44 of the generator 40. In FIG. 1, the generator 40 is an electrical generator 40 whose components 44 operate to produce electrical power for the engine 10 or for an aircraft to which the engine 10 may be mounted. The components 44 are driven by one or more spools of the engine 10, such as from a low pressure spool of the engine 10 that also drives the fan 12. The generator 40 may be configured to drive large electrical loads, and may work in conjunction with, or separately from, other electrical machines of the engine 10, such as a starter/generator of an accessory gearbox. Wires, cabling and other connectors, as well as cooling air, may be routed to the inner volume defined by the generator case 43 via the radially-extending struts 36 which may be hollow and which support the exhaust cone 28 from the shroud 32. In an alternate embodiment, the generator 40 operates to provide a mechanical output. The generator case 43 encloses the electrical components 44 and any mechanical components, and defines an outer surface 46 of the generator 40. The outer surface 46 is spaced radially inwardly from the inner surface 29B of the exhaust cone 28. In an embodiment in which the generator case 43 has an annular shape about the longitudinal axis 11, an annular gap or volume of air is defined between the outer surface 46 and the inner surface 29B, which may help to thermally insulate the components 44 from the hot exhaust gases flowing along the outer surface 29A of the exhaust cone 28. The generator 40 and its components 44 may be cooled using any suitable medium, such as bypass air. In an embodiment, the generator 40 is internally oil cooled. Positioning the generator 40 within the exhaust cone 28 of the engine 10 allows for adding components to the engine 10 without increasing the diameter of the engine 10, by at least partially filling a volume of the engine 10 (i.e. the internal cavity 29C) that would otherwise remain unused. The generator 40 is disposed radially inwardly of the TSC 37. The generator 40 may thus be referred to as a "tail cone" generator 40, or as an "exhaust cone" generator 40.

Referring to FIG. 1, a joint 50 is formed or defined between the TSC 37 and the generator case 43. The generator case 43, and thus the generator 40, is mounted to the TSC 37, and thus to the structure of the engine 10, via the joint 50. The TSC 37 supports the generator case 43, and thus the generator 40, within the engine 10 via the joint 50. In an embodiment, and referring to FIG. 1, the generator 40 is only supported by the TSC 37. In an embodiment, the generator 40 is free of connecting or supporting structure linking the generator case 43 to other structure of the engine 10. Referring to FIG. 1, the generator case 43 is cantilevered from the TSC 37 at the joint 50. Referring to FIG. 1, the generator case 43 (and the components 44 housed therein) are fixedly attached to the TSC 37 at the joint 50, and the remainder of the generator case 43 is suspended within the internal cavity 29C of the exhaust cone 28. The generator 40 in an embodiment therefore "floats" within the exhaust cone 28 and does not contact the inner surface 29B of the exhaust cone 28 during normal operation of the engine 10. In an alternate embodiment, the exhaust cone 28 has one or more struts extending radially inwardly from the inner surface 28B and which are mounted to the generator case 43 to structurally link the generator case 43 to the exhaust cone 28. In an alternate embodiment, the generator case 43 is supported from different structure of the engine 10 in addition to, or separately from, how the generator case 43 is supported by the TSC 37 at the joint 50.

The joint 50 may take different forms or configurations to achieve the functionality ascribed to it herein. One possible configuration for the joint 50 is shown in FIG. 2. The joint 50 includes, or is composed of, multiple joint members. Referring to FIG. 2, one of the joint members is a TSC flange 38 and another joint member is a generator case flange 48. The TSC flange 38 is part of the TSC 37, and the generator case flange 48 is part of the generator case 43. The TSC flange 38 and the generator case flange 48 are secured to one another using any suitable mechanism or feature, for example bolts 52, in order to mount the generator 40 to the TSC 37. The TSC flange 38 and the generator case flange 48 are annular bodies which extend circumferentially about the longitudinal axis 11, such that the joint 50 is an annular joint 50.

The generator case flange 48 (and possibly the generator case 43 as a whole) is composed of a first material. The TSC flange 38 (and possible the TSC 37 as whole) is composed of a second material that is different from the first material of the generator case flange 48. By "different", it is understood that the first material has a material composition that is different from the material composition of the second material. The composition of the first material is not identical to the composition of the second material. The first material and the second material may, for example, be metals that contain one or more similar metal alloys, but the concentration of the one or more metal alloys in the first metal is not the same as the concentration of the one or more metal alloys in the second metal. In one possible and non-limiting example of the material composition of the TSC flange 38 and of the generator case flange 48, the first and second materials are first and second metals. The first metal of the generator case flange 48 is Titanium or an alloy thereof, and the second metal of the TSC flange 38 is Inconel™ 718. Inconel™ 718 is a metal composition of nickel-chromium alloys. The specific composition of alloys within Inconel™ 718 may be defined as of the filing date of the present application. Thus, in the example of first and second metals provided above, the joint 50 is defined primarily by the two different metals of the TSC flange 38 and of the generator case flange 48, and may therefore be referred to as a "bimetallic" joint 50. The bimetallic or "bi-material" joint 50 supports the generator 40 within a tailcone or exhaust cone 28.

The first and second materials may be non-metallic. In one possible and non-limiting example of the material composition of the TSC flange 38 and of the generator case flange 48, the first and second materials are composite materials. In one possible and non-limiting example of composite materials for the TSC flange 38 and of the generator case flange 48, one of the TSC flange 38 and the generator case flange 48 is composed of carbon fibers encased in a suitable matrix and assuming the form of an annular body or ring, thereby forming a carbon fiber ring. The other of the TSC flange 38 and the generator case flange 48 is fiberglass assuming the form of an annular body or ring, thereby forming a fiberglass ring. If it is desired to impart additional flexibility to the composite materials, cut-outs or striations can be formed in the composite materials. Thus, in the example of first and second composite materials provided above, the joint 50 is defined primarily by the two different composite materials of the TSC flange 38 and of the generator case flange 48, and may therefore be referred to as a "bi-material" joint 50.

In the configuration where the joint 50 is "bimetallic", the first metal of the generator case flange 48 defines a first coefficient of thermal expansion, and the second metal of the TSC flange 38 defines a second coefficient of thermal expansion. The coefficient of thermal expansion describes how the generator case flange 48 and the TSC flange 38 will change as they experience changes in temperature during operation of the engine 10. In some instances, the coefficient of thermal expansion measures the fractional change in size (e.g. length or volume) per degree change in temperature. A metal that has a lower coefficient of thermal expansion will undergo less change in size than a metal that has a higher coefficient of thermal expansion. As will be described in greater detail below, the first coefficient of thermal expansion of the first metal of the generator case flange 48 is different from the second coefficient of thermal expansion of the second metal of the TSC flange 38. The coefficient of thermal expansion is a property resulting from the material composition of the TSC flange 38 and of the generator case flange 48, and thus the description above about the coefficients of thermal expansion applies mutatis mutandis to the configuration of the joint 50 which is non-metallic, or where only one of the first and second materials is metallic.

The generator case flange 48 may take different forms or configurations to achieve the functionality ascribed to it herein. One possible and non-limiting configuration for the generator case flange 48 is shown in FIG. 2. The generator case flange 48 extends axially relative to the longitudinal axis 11 from the outer surface 46 of the generator case 43 to join with the TSC flange 38. In the depicted embodiment, the generator case flange 48 includes an inner portion 48A, an outer portion 48B disposed radially outwardly of the inner portion 48A, and a center portion 48C disposed radially between the inner and outer portions 48A,48B. The radially outer portion 48B has an outer segment 48BO that extends axially from the outer surface 46 of the generator case 43 to an inner segment 48BI. The inner segment 48BI extends substantially radially relative to the longitudinal axis 11 to the center portion 48C. The inner and outer segments 48BI,48BO of the outer portion 48B provide the outer portion 48B with an "L" cross-sectional shape. The radially inner portion 48A extends axially and radially from the outer surface 46 of the generator case 43 to the center portion 48C. The inner, outer, and center portions 48A,48B,48C of the generator case flange 48 are annular bodies extending circumferentially about the longitudinal axis 11. The center portion 48C is spaced axially apart from the outer surface 46 of the generator case 43 by the inner and outer portions 48A,48B. An annular gap 48D is defined between the center portion 48C and the outer surface 46 of the generator case 43. The annular gap 48D is delimited by the inner, outer, and center portions 48A,48B,48C of the generator case flange 48, and by the outer surface 46 of the generator case 43.

Referring to FIG. 2, the center portion 48C has a centering protrusion 48CP that extends axially outwardly from a bolt face 48CS of the center portion 48C. The bolt face 48CS has a radial orientation, and is the part of the center portion 48C that is located axially furthest from the outer surface 46 of the generator case 43. In the embodiment shown in FIG. 2, the centering protrusion 48CP has a gap 48CG extending axially. In an alternate embodiment, the centering protrusion 48CP is full-bodied and the gap 48CG is not present. The centering protrusion 48CP is inserted within a centering aperture 38AA of the TSC flange 38, so as to properly align the bolt face 48CS against a corresponding bolt face 38AS of the TSC flange 38 when they are brought together, thereby helping to ensure that the bolts 52 are properly aligned. The center portion 48C includes bolt holes extending through the bolt face 48CS to receive the bolts 52. The centering aperture 38AA may form a relatively loose fit with the centering protrusion 48CP, thereby allowing the generator case flange 48 and the TSC flange 38 to abut against each other while minimising any fight between the generator case flange 48 and the TSC flange 38 as they are being centered as described below.

The TSC flange 38 may take different forms or configurations to achieve the functionality ascribed to it herein. One possible and non-limiting configuration for the TSC 38 is shown in FIG. 2. The TSC flange 38 extends radially inwardly relative to the longitudinal axis 11 from the core duct 34 and main gas path 26 defined by the shroud 32 to join with the center portion 48C of the generator case flange 48. In the depicted embodiment, the TSC flange 38 includes an inner portion 38A, an outer portion 38B disposed radially outwardly of the inner portion 38A, and a center portion 38C disposed radially between the inner and outer portions 38A,38B. The radially outer portion 38B has a radial orientation for abutment against, and securement to, another part of the TSC 37. The radially inner portion 38A has a radial orientation and defines the bolt face 38AS for abutting against the bolt face 48CS of the generator case flange 48. The inner portion 38A includes one or more of the centering apertures 38AA to receive therethrough the one or more centering protrusions 48CP of the generator case flange 48. The inner portion 38A may have one or more aperture walls 48AW which define the centering apertures 38AA (see FIG. 3). The centering apertures 38AA are slightly larger than the centering protrusions 48CP in order to more easily receive the centering protrusions 48CP therein and avoid fight between the generator case flange 48 and the TSC flange 38 when they are being centered as described below, such that the centering apertures 38AA act as a timing feature. The inner portion 38A includes bolt holes extending through the bolt face 38AS to receive the bolts 52, thereby securing the TSC flange 38 to the generator case flange 48.

Referring to FIG. 2, the center portion 38C of the TSC flange 38 has an inner arm 38CI, an outer arm 38CO spaced radially outwardly from the inner arm 38CI, and an end 38CE disposed radially between the inner and outer arms 38CI,38CO and connected thereto. The inner and outer arms 38CI,38CO have a substantially axial orientation relative to the longitudinal axis 11, but also extend along a radial direction. The end 38CE has a substantially radial orientation, and is the part of the center portion 38C that is positioned axially furthest from the generator case flange 48. The inner arm 38CI, the outer arm 38CO, and the end 38CE of the center portion 38C may form a "hairpin" cross-sectional shape. An annular gap 38D is delimited by the inner arm 38CI, the outer arm 38CO, and the end 38CE of the center portion 38C of the TSC flange 38, and by the generator case flange 48. The inner arm 38CI, the outer arm 38CO, and the end 38CE of the center portion 38C help to thermally insulate and isolate the inner portion 38A of the TSC flange 38 from the hotter outer portion 38B which is exposed to the hot exhaust gases in the core duct 34. During operation of the engine 10, the inner portion 38A of the TSC flange 38 may be at a lower temperature than the outer portion 38B, and the inner portion 38A may be at a lower temperature than the center portion 38C of the TSC flange 38. Other possible shapes for the TSC flange 38 are possible. For example, in another possible configuration, the center portion 38C extends substantially radially between the inner portion 38A and the outer portion 38B.

Referring to FIG. 2, another joint member of the joint 50 is an interface flange 58. The interface flange 58 is an annular body or ring that extends axially between, and engages, both the TSC flange 38 and the generator case flange 48. In so doing, the interface flange 58 forms a thermal and structural link between the TSC flange 38 and the generator case flange 48, and further strengthens the joint 50. The joint 50 in the depicted embodiment includes three flanges 38,48,58. Referring to FIG. 2, the interface flange 58 is separate from both the TSC flange 38 and the generator case flange 48. In an alternate embodiment, and as described in greater detail below, the interface flange 58 is integral with the generator case flange 48.

Referring to FIG. 3, the interface flange 58 extends substantially axially between a first end 58A that is engaged with the generator case flange 48, and a second end 58B that is engaged with the TSC flange 38. The first end 58A has a radially-extending portion 58AR that extends radially inwardly to a first end face 58AF that is engaged with a radially-outer face of the center portion 48C of the generator case flange 48. The second end 58B has a second end face 58BF that is engaged with the inner arm 38CI of the center portion 38C of the TSC flange 38. The first end face 58AF is disposed radially inwardly of the second end face 58BF. The second end 58B of the interface flange 58 is spaced radially inwardly from the hot outer portion 38B of the TSC flange 38, and is further thermally isolated from the hot outer portion 38B by the "hairpin" structure of the center portion 38C. The "hairpin" in the structural support TSC flange 38 helps the interface flange 58 to thermally insulate the generator case 43.

The engagement of the interface flange 58 with the TSC flange 38 and with the generator case flange 48 may take different forms. For example, and referring to FIG. 3, the interface flange 58 is in press fit, or interference fit, with the TSC flange 38 and the generator case flange 48. The first and second end faces 58AF,58BF of the interface flange 58 are in a tight tolerance fit with the TSC flange 38 and with the generator case flange 48. Referring to FIG. 3, this interference fit is caused by the interference flange 58 being an annular body or ring which is disposed radially outwardly of both the generator case flange 48 and of the TSC flange 38 relative to the longitudinal axis 11. The interface flange 58 is an annular body that radially overlaps part of the generator case flange 48 and part of the TSC flange 38. Referring to FIG. 3, the interface flange 58 is a continuous annular body, forming a single-piece ring. In an alternate embodiment, the interface flange 58 is composed of circumferentially separate and interconnected segments.

This radial positioning and tight fit of the interface flange 58 allows it to exert a radially inward force or pressure on part of the TSC flange 38 and upon part of the generator case flange 48. The radial inward compressive force helps to locate the bolt face 38AS of the TSC flange 38 with the bolt face 48CS of the generator case flange 48, and thus helps to counter vibrations or other movements which might cause the bolt faces 38AS,48CS to become misaligned during thermal expansion of one or both of the TSC flange 38 and of the generator case flange 48 when the engine 10 is operating. In an embodiment, the radial inward force exerted by the interface flange 58 is exerted when the interface flange 58 undergoes thermal expansion while the engine 10 is operating.

In an embodiment, and referring to FIG. 3, the second end 58B of the interface flange 58 is fixedly attached to the TSC flange 38. In the depicted embodiment, a rivet 54 is driven through the second end 58B and into the inner arm 38CI of the center portion 38C of the TSC flange 38. Other techniques for fixedly attaching the interface flange 58 to the TSC flange 38 are possible, such as pinning or brazing. In such an embodiment, the radial inward force exerted by the interface flange 58 is applied against part of the generator case flange 48, such as against the center portion 48C. The interface flange 58 and the generator case flange 48 are thus free of mechanical interconnection, the two flanges 58,48 only being linked to one another through a compressive friction fit. In such an embodiment, the part of the interface flange 58 which engages the generator case flange 48 may be referred to as a "spigot" that forms an interference fit with the generator case flange 48 when the interface flange 58 undergoes thermal expansion during operation of the engine 10. The compressive radial force exerted by the interface flange may help to locate the generator 40 by centering the generator case flange 48 with the TSC flange 38.

Figure 4:
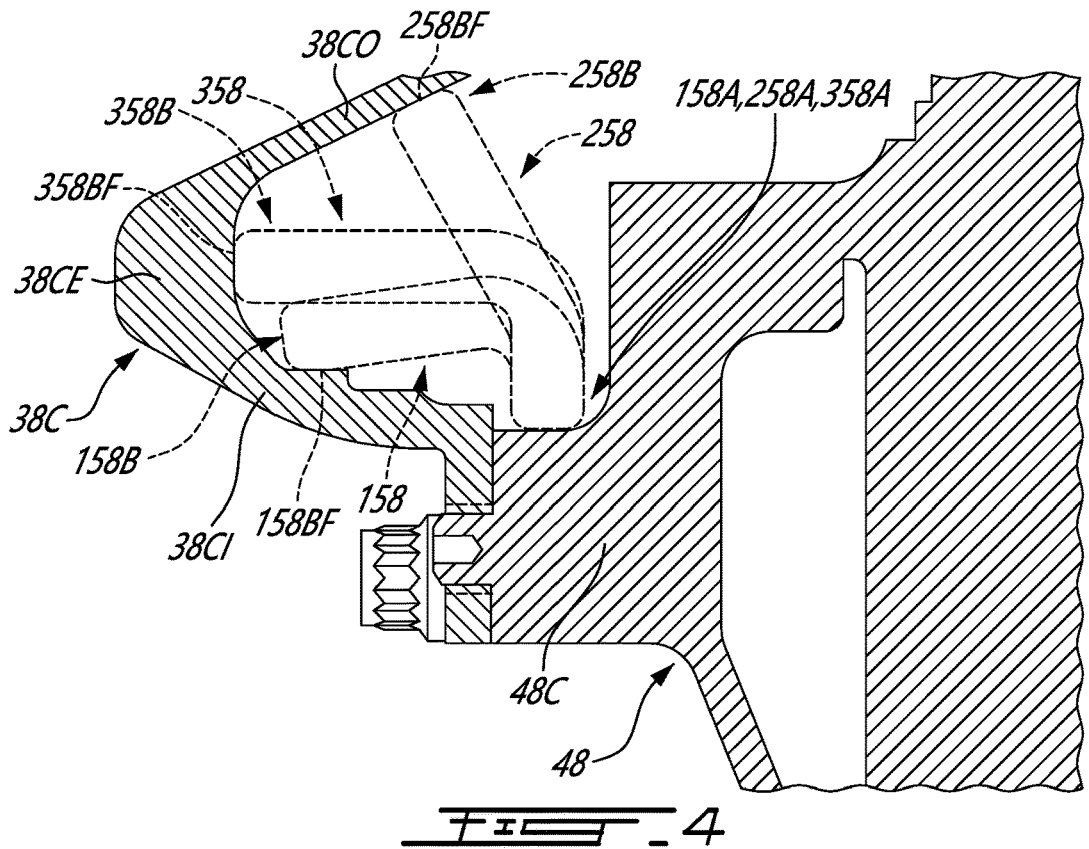
FIG. 4 is an enlarged cross-sectional view of section II-II of FIG. 1, showing other possible configurations of a bi-material joint.

Different shapes and/or configurations for the interface flange 58 are possible which still allow it to achieve the functionality ascribed to it herein. For example, and referring to FIG. 4, the interface flange 158 is a curved annular body or ring extending from a first end 158A engaged with a radially-outer face of the center portion 48C of the generator case flange 48, to a second end 158B spaced axially apart from the first end 158A. The second end 158B has a second end face 158BF that is engaged with the inner arm 38CI of the center portion 38C of the TSC flange 38. In another possible configuration, and referring to FIG. 4, the interface flange 258 is a radially-extending annular body or ring extending from a first end 258A engaged with a radially-outer face of the center portion 48C of the generator case flange 48, to a second end 258B spaced axially and radially apart from the first end 258A. The second end 258B has a second end face 258BF that is engaged with the outer arm 38CO of the center portion 38C of the TSC flange 38. In another possible configuration, and referring to FIG. 4, the interface flange 358 is an axially and radially extending annular body or ring extending from a first end 358A engaged with a radially-outer face of the center portion 48C of the generator case flange 48, to a second end 358B spaced axially apart from the first end 358A. The second end 358B has a second end face 358BF that is engaged with the end 38CE of the center portion 38C of the TSC flange 38.

In another possible configuration, the interface flange 58,158,258,358 is integral with the generator case flange 48, and extends substantially axially from the center portion 48C of the generator case flange 48 to the second end 58B,158B,258B,358B. The interface flange 58,158,258,358 may be integral with the generator case flange 48 in an embodiment where the interface flange 58,158,258,358 is composed of the same first material of the generator case flange 48. In one such possible configuration, the first metal of the generator case flange 48 is Titanium, and the interface flange 58,158,258,358 is also composed of Titanium in the same concentrations as in the first metal. The second metal of the TSC flange is Inconel™ 718, and is thus different from the first metal and from the metal of the interface flange 58,158,258,358. Making the "spigot" material of the interface flange 58,158,258,358 to be the same as that of the generator case flange 48 (e.g. Titanium) may allow for the Titanium spigot to grow tight with the Inconel™ 718 of the TSC flange 38 and exert the radial or compressive pressure for centering the bolt faces 38AS,48CS. Other pairings of the first and second metals of the bimetallic joint 50 configuration are possible. For example, the first metal of the generator case flange 48 is Aluminum, and the interface flange 58,158,258,358 is also composed of Aluminum in the same concentrations as in the first metal, whereas the second metal of the TSC flange 38 is Inconel™ 718. In another possible configuration of the bimetallic joint 50, the interface flange 58,158,258,358 is composed of a metal that is different from the first metal of the generator case flange 48. For example, the interface flange 58,158,258,358 may be composed of Invar (FeNi36 or 64FeNi) metal and the first metal of the generator case flange 48 is Titanium or Aluminum. In another possible configuration, the interface flange 58,158,258,358 is integral with the TSC flange 38, and extends substantially axially from the inner arm 38CI of the TSC flange 38 to the first end 58A. The interface flange 58,158,258,358 may be integral with the TSC flange 38 in an embodiment where the interface flange 58,158,258,358 is composed of a metal that is different from the second metal of the TSC flange 38.

Referring to FIG. 3, the interface flange 58,158,258,358 defines a third coefficient of thermal expansion that is equal to or less than the first coefficient of thermal expansion of the generator case flange 48. The third coefficient of thermal expansion of the interface flange 58,158,258,358 is also less than the second coefficient of thermal expansion of the TSC flange 38. The interface flange 58,158,258,358 will thus undergo the same or less thermal expansion as the generator case flange 48 during operation of the engine 10. The interface flange 58,158,258,358 will thus undergo less thermal expansion than the TSC flange 38 during operation of the engine 10. In an embodiment, the first coefficient of thermal expansion of the generator case flange 48 is less than the second coefficient of thermal expansion of the TSC flange 38, such that the generator case flange 45 will undergo less thermal expansion than the TSC flange 38 during operation of the engine 10. The third coefficient of thermal expansion of the interface flange 58,158,258,358 is thus similar to that, or less than that, of the cooler second joint member (i.e. the generator case flange 48) and less than that of the hotter first joint member (i.e. the TSC flange 38). In an embodiment, the third coefficient of thermal expansion of the interface flange 58,158,258,358 is the same as the second coefficient of thermal expansion of the generator case flange 48, such that the interface flange 58,158,258,358 matches the generator case flange 48 on thermal expansion, and allows the flanges 38,58,158,258,358 to expand thermally together. In such an embodiment, the third coefficient of thermal expansion of the interface flange 58,158,258,358 is the same as the second coefficient of thermal expansion of the generator case flange 48 because the interface flange 58,158,258,358 and the generator case flange 48 are composed of the same first material.

The interface flange 58,158,258,358 may thus help to achieve two functions: 1) to alleviate the thermal mismatch between the structural TSC flange 38 and the generator case flange 48 during operation of the engine 10, and 2) to exert a radially inward pressure or compression when the interface flange 58,158,258,358 expands thermally in order to help locate the face 38CS of the structural TSC flange 38 where the bolt 52 is. Such a bi-material flange joint 50 allows for maintaining a tight fit between the joint members while also being able to endure high temperature deltas at different areas in the joint 50. For example, during operation of the engine 10, there may be an important thermal mismatch between the TSC flange 38 and the generator case flange 48 which may cause thermal stresses. By thermally matching the spigot material of the interface flange 58,158,258,358 to the material of the generator case flange 48, the interface flange 58,158,258,358 may be able to grow tight with the structural TSC flange 38 during engine operation and minimize the growth at the spigot area of the interface flange 58,158,258,358 allowing a tight fit to be maintained through the running range of the engine 10. By maintaining a tight interference fit with the interface flange 58,158,258,358, it may be possible to eliminate vibration that may result from thermal expansion of the TSC flange 38. Maintaining a tight fit at all running conditions may help to prevent engine unscheduled removal and unplanned maintenance caused by premature wear at the mechanical interfaces of the joint 50, and/or may prevent dynamic/vibrations issues for the mated components.

During operation of the engine 10, the temperature varies throughout the joint 50. In most instances, the joint 50 is hottest at the TSC flange 38 and coolest at the generator case flange 48. The temperature may also vary throughout the interface flange 58,158,258,358. The interface flange 58,158,258,358 may experience a thermal gradient during operation of the engine 10 between its axially spaced-apart first and second ends 58A,58B,158A,158B,258A,258B, 358A,358B. The interface flange 58,158,258,358 may have a first temperature that is substantially equal to a temperature of the generator case flange 48 at a location where the interface flange 58,158,258,358 engages the generator case flange 48, for example in the configuration where the interface flange 58,158,258,358 and the generator case flange 48 have the same or similar coefficients of thermal expansion. The interface flange 58,158,258,358 may have a second temperature at a location where the interface flange 58,158,258,358 engages the TSC flange 38 that is greater than the first temperature. Thus, during operation of the engine 10, there may be a temperature variation throughout the interface flange 58,158,258,358, where part of the spigot in contact with generator case flange 48 has the same or similar temperature as the generator case flange 48, and the temperature gradually increases along an axial direction through the interface flange 58,158,258,358 toward the second end 58B,158B,258B,358B thereof to achieve approximately the same temperature as the TSC flange 38. This may create thermal stress in the interface flange 58,158, 258,358 over time, but this may not be consequential because the interface flange 58,158,258,358 is an engine component that may be easily replaced. Alternatively, any thermal stress in the interface flange 58,158,258,358 may be reduced due to the length of the interface flange 58,158,258, 358 which may allow the temperature gradient to be distributed over a longer distance.

Referring to FIG. 2, the bi-material joint 50 is a flange structure in hot sections of the engine 10 or other power plants. The flange structure consists of a structural flange (i.e. the TSC flange 38) that is exposed to high temperatures during operation of the engine 10, and which is mounted to a generator case 43 which experiences and operates at much lower temperatures. The structural TSC flange 38 is made from a different material (e.g. Inconel™ 718) than the material (e.g. Titanium) of the generator case 43, such that the structural TSC flange 38 has a different coefficient of thermal expansion than the coefficient of thermal expansion of the generator case 43. The bi-material joint 50 also has a "bridging" flange (i.e. the interface flange 58,158,258,358) that extends between the generator case 43 and the TSC flange 37. The bridging interface flange 58,158,258,358 is made of a material that may be the same as the first material of the generator case 43, such that the coefficient of thermal expansion of the interface flange 58,158,258,358 is the same as, or less than, the coefficient of thermal expansion of the generator case 43. In an embodiment, the interface flange 58,158,258,358 is a ring which exerts a radially-inward pressure on the generator case flange 48 to help locate the generator case 43 relative to the TSC flange 38.

In light of the preceding, there is disclosed herein a flange arrangement in hot sections of an engine or other power plants which connects a hot structural flange to a cooler component, where the flange arrangement has a mechanical interface structure that extends between the hot structural flange and the cooler component, and where the interface structure has a coefficient of thermal expansion that is similar to that of the cooler material and less than that of the hotter material.

There is disclosed a method of assembling a bi-material joint 50. The method comprises assembling a first flange 48 composed of a first material and having a first coefficient of thermal expansion to a second flange 38 composed of a second material and having a second coefficient of thermal expansion. The method comprises engaging an interface flange 58,158,258,358 to both of the first and second flanges 48,38 and interference fitting the interface flange 58,158, 258,358 to at least the first flange 48. The interface flange 58,158,258,358 has a third coefficient of thermal expansion that is less than or equal to the first coefficient of thermal expansion, and less than the second coefficient of thermal expansion. The method comprises securing the first flange 48 to the second flange 38 to form the bi-material joint 50. The method may include brazing or pinning the interface flange 58,158,258,358 to the second flange 38. The method may include machining the interface flange 58,158,258,358 as a single piece. Machining the interface flange 58,158, 258,358 as one piece may help to minimize tolerance stackup and maintain the same tolerance as the single piece second flange 38 while allowing greater thermal differential to be tolerated. The method may include replacing or repairing the interface flange 58,158,258,358.

The expression "substantially axially" used herein refers to a directional vector of a component described herein, where the magnitude of the directional vector in the axial direction relative to the longitudinal axis 11 is greater than the magnitude of the directional vector in the radial direction relative to the longitudinal axis 11. The expression "substantially radially" used herein refers to a directional vector of a component described herein, where the magnitude of the directional vector in the radial direction relative to the longitudinal axis 11 is greater than the magnitude of the directional vector in the axis direction relative to the longitudinal axis 11.

The embodiments described in this document provide non-limiting examples of possible implementations of the present technology. Upon review of the present disclosure, a person of ordinary skill in the art will recognize that changes may be made to the embodiments described herein without departing from the scope of the present technology. Yet further modifications could be implemented by a person of ordinary skill in the art in view of the present disclosure, which modifications would be within the scope of the present technology.

The invention claimed is:

1. An aircraft engine, comprising:
  an exhaust cone defining a center axis and an internal cavity;
  a generator case within the internal cavity of the exhaust cone, the generator case having a generator case flange composed of a first material and defining a first coefficient of thermal expansion; and
  a turbine support case (TSC) having a TSC flange composed of a second material and defining a second coefficient of thermal expansion, the second material being different from the first material; and
  a joint between the TSC and the generator case, the generator case flange secured to the TSC flange at the joint, the joint comprising an interface flange engaged with the generator case flange and with the TSC flange, the interface flange defining a third coefficient of thermal expansion being equal to or less than the first coefficient of thermal expansion of the generator case flange, the third coefficient of thermal expansion being less than the second coefficient of thermal expansion of the TSC flange.

2. The aircraft engine of claim 1, wherein the interface flange is composed of the first material.

3. The aircraft engine of claim 1, wherein the third coefficient of thermal expansion of the interface flange is equal to the first coefficient of thermal expansion of the generator case flange.

4. The aircraft engine of claim 1, wherein the interface flange is disposed radially outwardly of the generator case flange and of the TSC flange relative to the center axis, the interface flange exerting a radially inward force on part of the TSC flange upon the interface flange undergoing thermal expansion.

5. The aircraft engine of claim 1, wherein the interface flange is in interference fit with the generator case flange.

6. The aircraft engine of claim 1, wherein the interface flange is an annular body and radially overlaps part of the generator case flange and part of the TSC flange.

7. The aircraft engine of claim 1, wherein the interface flange is disposed radially outwardly of the generator case flange and of the TSC flange relative to the center axis, the interface flange exerting a radially inward force on part of the generator case flange upon the interface flange undergoing thermal expansion.

8. The aircraft engine of claim 1, wherein the interface flange experiences a thermal gradient during operation of the aircraft engine, the interface flange having a first temperature equal to a temperature of the generator case flange at a location where the interface flange engages the generator case flange, the interface flange having a second temperature greater than the first temperature at a location where the interface flange engages the TSC flange.

9. The aircraft engine of claim 1, wherein the TSC flange includes a first portion secured to the generator case flange, and a second portion extending axially away from the first portion relative to the center axis and axially spaced from the generator case flange.

10. The aircraft engine of claim 1, wherein the interface flange is integral with the generator case flange, the interface flange extending substantially axially from the generator case flange relative to the center axis.

11. The aircraft engine of claim 1, wherein the generator case is cantilevered from the TSC at the joint.

12. The aircraft engine of claim 1, wherein the first material of the generator case flange is Titanium, the interface flange is composed of Titanium, and the second material of the TSC flange is a composition of nickel-chromium alloys.

13. An engine bi-material joint in an aircraft engine having a generator case and a turbine support case, the engine bi-material joint comprising:

a first flange composed of a first material and defining a first coefficient of thermal expansion, the first flange being a generator case flange extending from the generator case;

a second flange composed of a second material and defining a second coefficient of thermal expansion, the second flange being different from the first material, the second flange being a turbine support case flange extending from the turbine support case; and an interface flange engaged with the first flange and with the second flange, the interface flange defining a third coefficient of thermal expansion being equal to or less than the first coefficient of thermal expansion of the first flange, the third coefficient of thermal expansion being less than the second coefficient of thermal expansion of the second flange, and the first coefficient of thermal expansion of the first flange being less than the second coefficient of thermal expansion of the second flange.

14. The engine bi-material joint of claim 13, wherein the interface flange is composed of the first material.

15. The engine bi-material joint of claim 13, wherein the third coefficient of thermal expansion of the interface flange is equal to the first coefficient of thermal expansion of the first flange.

16. The engine bi-material joint of claim 13, wherein the interface flange is disposed radially outwardly of the first flange and of the second flange relative to a center axis of the engine bi-material joint, the interface flange exerting a radially inward force on part of the second flange upon the interface flange undergoing thermal expansion.

17. The engine bi-material joint of claim 13, wherein the interface flange is in interference fit with the first flange.

18. The engine bi-material joint of claim 13, wherein the interface flange is disposed radially outwardly of the first flange and of the second flange relative to a center axis of the engine bi-material joint, the interface flange exerting a radially inward force on part of the first flange upon the interface flange undergoing thermal expansion.

19. The engine bi-material joint of claim 13, wherein the interface flange experiences a thermal gradient during operation of the engine, the interface flange having a first temperature equal to a temperature of the first flange at a location where the interface flange engages the first flange, the interface flange having a second temperature greater than the first temperature at a location where the interface flange engages the second flange.

20. The engine bi-material joint of claim 13, wherein the first material of the first flange is Titanium, the interface flange is composed of Titanium, and the second material of the second flange is a composition of nickel-chromium alloys.

* * * * *